Figure 1:
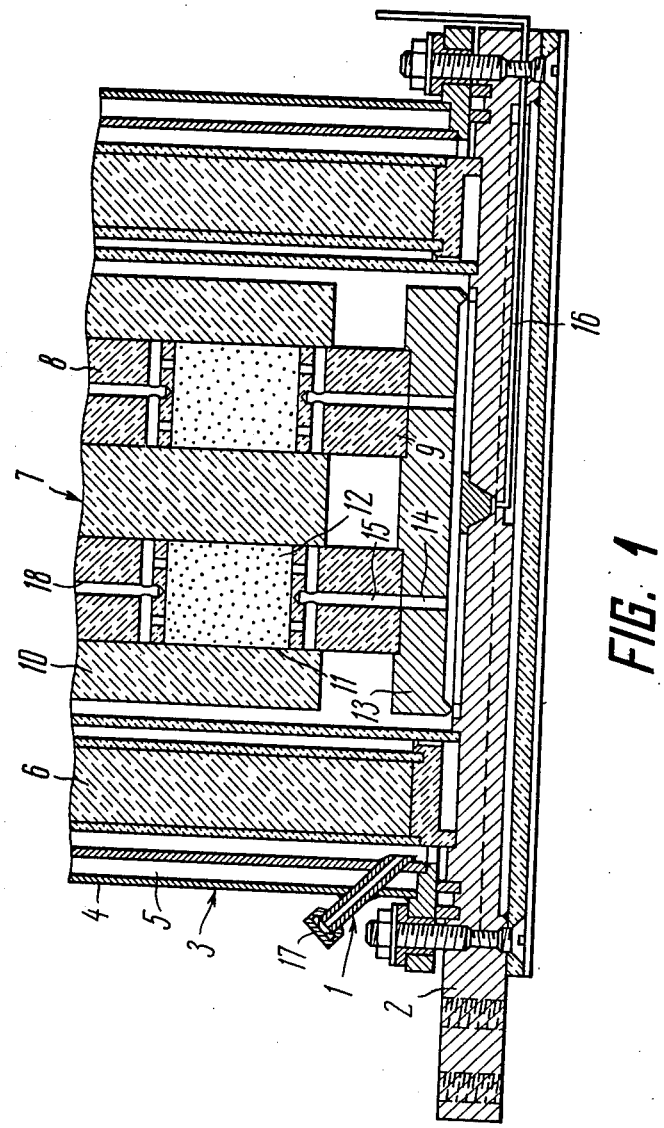

United States Patent [19]

Padalko et al.

[11] 4,115,623

[45] Sep. 19, 1978

[54] POROUS MATERIAL FOR MAKING TOOL-ELECTRODE AND METHOD OF PRODUCING SAME

[76] Inventors: Oleg Vadimovich Padalko, Nizhny Kislovsky pereulok, 8, kv. 7; Maxim Lvovich Levit, prospekt Vernadskogo 91, korpus 1, kv. 25; Nikolai Vasilievich Voinov, Krasnodarskaya ulitsa, 8, kv. 6, all of Moscow, U.S.S.R.

[21] Appl. No.: 717,519

[22] Filed: Aug. 25, 1976

[30] Foreign Application Priority Data

Dec. 8, 1975 [SU] U.S.S.R. .................................. 2192874

[51] Int. Cl.² .............................................. B22F 3/00
[52] U.S. Cl. .................................. 428/566; 29/25.17; 75/211; 75/221; 75/222; 75/226
[58] Field of Search .................. 75/221, 211, 222, 226; 29/182, 25.17; 428/566

[56] References Cited

U.S. PATENT DOCUMENTS

| 2,789,901 | 4/1957 | Shipe et al. .............................. 75/221 |
| 3,638,293 | 2/1972 | Peterson .................................. 75/221 |
| 3,980,445 | 9/1976 | Aleshin et al. ........................... 75/222 |

*Primary Examiner*—Brooks H. Hunt
*Attorney, Agent, or Firm*—Lackenbach, Lilling & Siegel

[57] ABSTRACT

The porous material adapted for making a tool-electrode therefrom features the porosity up to 15 – 25 percent of its volume, pore size within 10 to 40 microns and oxygen content up to 0.1 wt.%.

The method proposed for producing such a material resides in hot compression moulding of a powdery electrode material. The powdery material is first heated in a compression mould to a temperature equaling 0.3 to 0.5 of the melting temperature in degrees centigrade while pumping a gaseous reducing agent therethrough at a pressure of 1.2 – 1.8 atm, whereupon the powdery material is held for some lapse of time at that temperature, while continuing to feed said reducing gas in a quantity exceeding the stoichiometric one. Next the powdery material is heated to a temperature in degrees centigrade equal to 0.6 to 0.9 of the melting temperature, and a pressure is applied thereto to obtain the required porosity of the material being prepared.

6 Claims, 2 Drawing Figures

POROUS MATERIAL FOR MAKING TOOL-ELECTRODE AND METHOD OF PRODUCING SAME

The present invention relates to spark-erosion machining practice and has particular reference to a porous material for making tool-electrodes for spark-erosion machining applicable in manufacturing diverse profiled parts from electrically conducting materials, and for cutting such materials, and to a method of producing such a material.

Attempts have been heretofore made in the spark-erosion machining practice to utilize porous materials for making tool-electrodes. Thus, e.g., one prior-art tool electrode for spark-erosion machining is available from Japan Pat. No. 280038, Cl. 74 No. 62, said tool-electrode being made in porous copper at a porosity of 30 to 40 percent. The pores of said material are adapted for force-feeding therethrough of a liquid conducive to carrying away the products of spark-erosion process from the spark gap. To provide a required rate of withdrawal of spark-erosion products from the machining zone, an appropriate amount of the liquid feed should be ensured; that is why the pore size should range between 100 and 150 microns in the case of the aforesaid porosity. Otherwise, the pressure of the liquid has to be substantially raised which will eventually result in a sophisticated device for spark-erosion machining as a whole. Yet a tool-electrode featuring the aforesaid porosity and pore size (100 to 150 microns) loses its mechanical strength and is readily liable to spalling out which, on the one hand, adversely affects the quality of surface finish, increases the number of short-circuits occurring across the spark gap and, thereby, badly reduces the productivity of the spark-erosion machining and, on the other hand, drastically decreases the durability of the tool-electrode.

Of late we have been successful in developing a tool-electrode or, to be more precise, a material for a tool-electrode applicable in spark-erosion machining process, and a method of producing said material (cf., e.g., USSR Inventor's Certificate No. 489,617, Cl.B 23p 1/12, filed on July 25, 1974, issued on Oct. 30, 1975). The tool-electrode under discussion is essentially a solid of a preset configuration made in a porous metallic material, such as copper, featuring a porosity of 15 to 25 percent and pore size from 10 to 40 microns.

The aforementioned method of producing a porous electrode material as proposed by us, resides in hot compression moulding of a powder, for example, copper powder in a closed compression mould and a force conveying of a reducing gas, such as hydrogen through the bulk of the powder at a temperature equal to 0.3–0.5 of the melting temperature of the electrode material, followed by a temperature rise to a level equal to 0.6–0.9 of the melting temperature of the electrode material, and by applying a pressure necessary for attaining a preset porosity of said material.

A disadvantage inherent in the known tool-electrode resides in its increased brittleness (viz., inadequate strength and plasticity) which is most markedly pronounced when small-cross-section working elements, such as ribs, projections, thin and sharp edges, etc. are made on the tool surface by resorting to, say, mechanical treatment or some other techniques. Brittleness of such elements results in spoilage occurring both in making a profiled tool-electrode and in its operation. In the latter case spoilage manifests itself in higher wear on the small-section elements, in particular, as spalling out o the material that eventuates, on the one hand, in im paired machining accuracy, and on the other hand, ir arising short-circuits across the spark gap, disturbed stability of the spark-erosion process and adversely affected machining capacity.

A disadvantage peculiar to the known method lies with its low productivity and high cost of tool-electrodes made thereby, both being due to a necessity of experimental correction of such production process parameters as the pressure of the reducer gas at the inlet of the compression mould and the amount of the gas delivered when changing over from one raw stock, say, copper powder to another original stock differing from the previous one in, say, granulometric composition and/or oxygen content, inasmuch as the values of these parameters are not specified in the known method. Thus, one should use the results of prolonged and labour-consuming experimental spark-erosion machining processes as the criteria of optimization of the aforesaid parameters.

Another disadvantage of the known method is the pollution of the effective space of the heating chamber with the products of reduction process, e.g., condensation of water vapours on the cooled surfaces in the case of hydrogen used as a reducing agent. Such a pollution prolongs standstill periods of the process equipment when subjected to routine maintenance procedures and impairs the productivity of the production process.

It is an object of the present invention to render the tool-electrode more durable.

It is another object of the present invention to make the tool-electrode less brittle and thereby improve workability thereof.

Among other objects of the present invention there may be noted one of increasing the productive capacity of the tool-electrode due to higher mechanical strength thereof.

It is one more object of the present invention to develop a method capable of producing a durable tool-electrode more plastic as compared to the heretofore-known one.

It is still more object of the present invention to improve the quality of surface finish within a substantially broad range of surface irregularities.

It is yet still more object of the present invention to provide a method of producing porous electrode material.

Said and other objects are accomplished due to the fact that a porous material contains, according to the invention, some oxygen ranging from ca. 0.01 wt.% to ca. 0.1 wt.%.

The present invention is based upon investigations which have demonstrated that the cause of deteriorated spark-erosion properties of a porous tool-electrode made of a material of impaired strength and plasticity lies with the presence of some brittle oxides occurring as intercalations and individual inclusions at the boundary of and within the grains of the material, said oxides being substantially the residues of oxide films inescapably present on the surface of the grains of the powdery material that has been used as original stock for making a porous tool-electrode therefrom.

Oxide films and inclusions present in the material weaken the interbonding of the metal grains, affects adversely the heat- and electric conductivity characteristics of the material, and occur to be the concentrators of stresses arising in the material as a result of, say, mechanical treatment or machining, and the sources of origin of incipient tiny cracks.

Oxygen content within the above-specified limits is accounted for by the fact that when oxygen content in the material (e.g., copper) is less than 0.1 wt.% oxygen is present in the material largely as a solid solution in the principal component thereof rather than in the form of brittle oxide inclusions. On the other hand, oxygen content dropped to a level below 0.01 wt.% greatly complicates the production process of a tool-electrode and adds to te cost thereof without improving its spark-erosion characteristics. Selection of the oxygen content falling within the afore-stated weight percent range depends upon the geometric characteristics of the profile-shaped tool-electrode working surface and the requisites imposed upon the amount of irregularities (or roughness) on the surface being machined. When selecting said oxygen content we proceed from the following considerations: in making a tool-electrode having working elements (such as projections or ribs) whose thickness is below 1.5 mm, or making a tool-electrode for finish spark-erosion machining ($R_z \leqq 10$ microns), the oxygen content is selected to approximate the lower limit of the aforesaid range and be within about 0.02 to about 0.04 wt.%; whereas in making a tool-electrode with working elements having a thickness in excess of 5 mm, making a tool-electrode to rough spark-erosion machining ($R_z = 40$ microns), the oxygen content is selected to be closer to the upper limit of the aforesaid range and lie within ca. 0.07 to ca. 0.09 wt.%. In the case of a copper tool-electrode the most reasonable oxygen content is within ca. 0.02 to 0.05 wt.%. The herein-proposed material can be obtained by resorting to a method, whereby a pressure of from 1.2 to 1.8 atm.abs. of a reducing gas (say, hydrogen) is established at the inlet of the compression mould, and a total rate of flow of the reducing gas force conveyed at a temperature equal to 0.3–0.5 of the melting temperature in degrees centigrade of the electrode material, through the bulk of powder contained in the compression mould, ranges within two to about twenty stoichiometric volumes, i.e., 2 to 20 times the amount of the reducing gas required theoretically for a complete reduction of oxides and diminishing the oxygen content to a level ensuring high spark-erosion characteristics of the tool-electrode.

Provision of the range of pressures of the reducing gas within the aforesaid limits is accounted for by the amount of hydraulic friction offered by the powdery materials being handled, whose granulometric composition makes it possible to obtain a tool-electrode having the above-specified parameters according to the herein-proposed invention. With the reducing-gas pressure at the inlet of the compression mould below 1.2 atm. the flow of gas delivered through the bulk of the powder is liable to quickly decay with the result that part of the powder remains underreduced, while the tool-electrode possesses spark-erosion characteristics spread nonuniformly over its volume. When the pressure of the reducing gas at the inlet of the compression mould exceeds 1.8 atm. the powder is likely to pass into a fluidized state and be carried away from the compression mould. Selection of the reducing gas pressure within the aforesaid range depends upon the granulometric composition of the powder being pressed and the height of the powder column in the compression mould, and is relied upon the following considerations: in making a tool-electrode featuring the size of a pore approximating the upper limit, that is, 30 to 35 microns and/or being 20 to 30 mm high the pressure of the reducing gas is selected to approximate the lower limit, i.e., 1.4–1.3 atm; in making tool-electrodes with the pore size approximating the lower limit (20–15 microns) and/or being 100 to 150 mm high the pressure of the reducing gas is selected to approximate the upper limit, i.e., 1.6–1.7 atm.

An excess of the total amount of the reducing gas as compared to the stoichiometric one is necessitated by the chemical kinetics of the reaction of reduction proceeding in the bulk of powder found in the compression mould. The time-restricting stage of the reduction process is one of intraparticle diffusion of the reduction products, the rate of which depends upon the difference between the concentration of said products in the intraparticle pores of the compound being reduced and that effective in the interparticle space. An excess amount of the reducing gas has to be introduced into the reaction zone for decreasing the reaction rate.

Selection of the range of an excess amount of the reducing gas depends upon the fact that when said excess amount is less than twofold, a decrease in the concentration of the reduction products in the interparticle space proves to be inadequate for the process to accelerate, whereas with the excess amount more than twentyfold, the total rate of the process is increased but negligibly, while an overconsumption of the reducing agent renders the process more expensive. Selection of an excess amount of the reducing gas within the aforesaid range depends upon the fineness ratio of the powder being reduced and the oxygen content therein; it proceeds from the following considerations: whenever it is necessary that the pores of a tool-electrode should have the size approximating the upper limit (30 to 35 microns), which is the case in reducing coarse-grained powders and/or in making tool-electrodes from powders featuring an original oxygen content exceeding 6 wt.%, the excess amount of the reducing gas is selected to approximate the upper limit, i.e., is sixteen-eighteenfold, whereas in case of a tool-electrode having the size of pores close to the lower limit (15–12 microns) and/or in making tool-electrodes from powders with an original oxygen content below 1 wt.%, the excess of the reducing gas is selected to approximate the lower limit, i.e., four-fivefold.

It is expedient that the reduction products be withdrawn from the compression mould when fully isolated from the effective space of the heating chamber, e.g., by discharging said products via a tube whose inlet end communicates with the compression mould and the outlet end is brought to the ambient atmosphere through the wall or some other member of the chamber.

Figure 2:
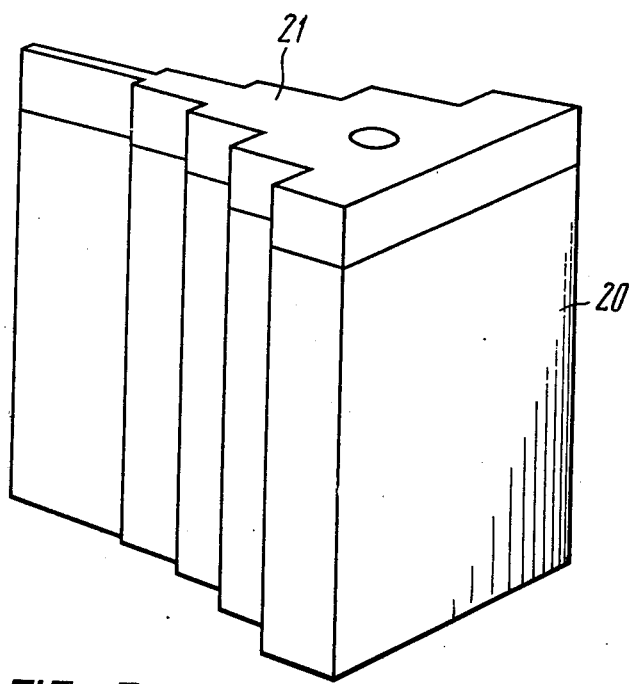

The present invention will now be disclosed in a number of specific and preferred embodiments thereof given by way of illustration with reference to the accompanying drawings, wherein:

FIG. 1 is a schematic sectional view of a hot compression moulding chamber for producing the herein-proposed material for a tool-electrode, enabling the herein-proposed method to be carried into effect; and FIG. 2 is a stepped tool-electrode showing the elements of the working surface thereof to be of different cross-sections.

Referring now to FIG. 1 shown at Ref. No. 1 is a chamber as a whole which can be made use of for realization of the method proposed herein. All the elements of the chamber are mounted on a bearing plate 2. The chamber features its shell 3 having a double wall 4 which confines a passage 5 for a fluid coolant (say, water) to flow therealong. To minimize heat losses occurring in the chamber a heat retaining shield 6 is provided. Accommodated inside the chamber is a compression mould 7 of a special design making provision for a reducing gas to be fed to the powder being handled. One of the embodiments of the present invention will hereinafter be the subject of the present disclosure on a more detailed scale. In the herein-considered case use is made of the multiple-cavity compression mould 7, FIG. 1 illustrating only two of the cavities thereof. The cavities of the compression mould 7 each incorporate a top male die 8 and a bottom male die 9, both of them travelling in a female die 10. A space 11 confined within the faces of the male dies and the walls of the female dies is adapted for accommodating a material 12 intended for making a blank or a profiled tool-electrode therefrom. The bottom male dies 9 rest upon an intermediate plate 13. Both the plate 13 and the male die 9 have coaxial ducts 14 and 15, respectively, adapted for a chemically active reducing gas (say, hydrogen) to feed into the space 11 to the material 12 therein. The ducts 14 communicate with a duct 16 in the bearing plate, which duct, in turn, is communicated with the source (not shown) of the active reducing gas. The same ducts can be used for withdrawal of the reaction products. This being the case, the outlet of the duct 16 is communicated with the evacuation device (not shown), and the active reducing gas is fed into the chamber through an inlet connection 17 communicating with the source of the active reducing gas and with ducts 18 in the top male dies 8. The compression mould 7 is heated by virtue of electric current passed through an electric heater made as a thin-walled graphite tube connected to the source of current (not shown).

The compression moulding process is effected by virtue of the press platen (not shown) carrying the bearing plate. Whenever the male and female dies are appropriately shaped a tool-electrode can be made immediately in the device of FIG. 1.

EXAMPLE 1

Copper powder featuring an average grain size of 45 microns and an oxygen content of 1.2 wt.% was charged into the female die 10 of the compression mould 7 in an amount of 0.5 kg, then the compression mould was placed in the effective space of the heating chamber 1 of the hot compression moulding device as shown in FIG. 1. The powder 12 was heated in the compression mould to 500° C. and then held at that temperature for 20 min. under a continuous passing of hydrogen through the compression mould; hydrogen was fed through the inlet connection 17 and along the ducts 18 in the top male dies 8, and withdrawn along with the reduction products (i.e., water vapours) by means of a pump, through the ducts 15 in the bottom male dies and the duct 16. The hydrogen pressure at the inlet of the compression mould was maintained at 1.2–1.3 atm, while a total amount of hydrogen passed through the compression mould in the course of reduction of the powder 12 made up 18 lit. which was three times the stoichiometric quantity. Upon completion of the reduction process which was judged by dropping of the concentration of water vapour in the exit gases to that in hydrogen, the compression mould containing the powder, was heated to 850° and a pressure of 70 kg/mm² was applied to the powder. The material of the thus-obtained blank was characterized by the following properties: porosity, 18 percent; average pore diameter, 16 microns; oxygen content, 0.08 wt.%. The material of the prior-art blank obtained by the heretofore known method, featured the porosity of 17 percent, average pore diameter, 15 microns and oxygen content in excess of 0.1 wt.%. A tool-electrode was made from each such blank by resorting to a mechanical treatment, said tool-electrode being represented in FIG. 2, wherein the tool-electrode is indicated at 20 and the working surface of said tool-electrode, at 21. The thickness of the elements of the working surface diminished in steps from 10 to 1 mm. Both of the tool-electrodes were tested in machining blind cavities in carbon-steel workpieces on an electro-erosion profile broaching machine having a generator capable of producing sawtooth pulses at a frequency of 22 to 66 kHz and a working current of 15 to 10 A. An average machining capacity of the known tool-electrode was equal to 8 mm³/A·min, while that of the tool-electrode according to the present invention equalled 10 mm³/A·min. Amount of relative wear on the first four steps of the tool-electrodes was practically the same and equalled 1.5 percent, while an average amount of relative wear on the next-to-the-last and the last steps of the known tool-electrode was equal to 8 and 15 percent, respectively; that of the tool-electrode according to the present invention, 5 and 8 percent, respectively. There occurred two cases where mechanical treatment of the known tool-electrode resulted in blind cracks at the place of passing from the next to last electrode step to the last one. At the place of emergence of said crack on the working surface of the tool-electrode there was observed a higher amount of local wear reaching as high as 22 percent. Upon mechanical treatment of the tool-electrodes according to the present invention no cracks were found.

EXAMPLE 2

Was carried out on the device described above. The powder 12 similar to that used in Example 1 but containing oxygen in an amount of 3 wt.%, was charged into the female die of the compression mould 7 and the latter was placed in the heating chamber of the hot compression moulding device. The powder was heated in the compression mold to 500° C. and held at that temperature for 30 min. while hydrogen is continuously passing through the compression mould. The hydrogen pressure at the inlet of the compression mould equalled 1.5–1.6 atm, and a total amount of hydrogen passed through the compression mould made up 54 lit. which was nine times the stoichiometric quantity. The high-temperature stage of the process is quite similar to that described in Example 1. The resultant material featured a porosity of 19 percent, an average pore diameter of 17 microns, and an oxygen content of 0.05 wt.%. Spark-erosion machining with a tool-electrode made from the thus-obtained material yielded the following data: average machining capacity, 11 mm³/A·min; amount of relative wear on the first four steps, ca. 1.3 percent; average amount of relative wear on the next to last step, 4 percent; that on the last step, 6 percent. No cracks whatever were found to occur upon mechanical treatment.

EXAMPLE 3

The material of the tool-electrode as shown in FIG. 2 was prepared by resorting to the device diagrammatically illustrated in FIG. 1 by applying the process techniques described in Examples 1 and 2. In this case the hydrogen pressure at the inlet of the compression mould was 1.7 atm, and the amount of hydrogen passed was 18 times the stoichiometric quantity. The oxygen content in the material dropped down to as low as 0.02 wt.%. Experimental spark-erosion machining with the tool-electrode made of the obtained material exhibited the following results: average machining capacity, 11.5 mm$^3$/A·min; amount of relative wear on the first four steps, 1.3 percent; average amount of relative wear on the next to last step, 3.6 percent; that on the last step, 5.3 percent.

Realization of the herein-proposed invention makes it possible to substantially add to the strength of a tool-electrode and to the durability thereof.

What we claim is:

1. In a porous material for making a tool-electrode applicable for spark-erosion machining, said material featuring a porosity up to 15–25 percent of the entire volume thereof, a pore size from about 10 microns to about 40 microns, the improvement which comprises, maintaining the oxygen content of said material from about 0.01 wt.% to about 0.1 wt.%.

2. A material as claimed in claim 1, based upon copper and containing oxygen in an amount of from 0.02 to 0.05 wt.%.

3. A method of producing a porous material for making a tool-electrode by way of hot compression moulding in a closed mould, comprising charging a compression mould with a porous powder having a pore size from about 10 to about 40 microns, heating to a temperature in degrees centigrade equal to 0.3–0.5 of the melting temperature of the electrode material, concurrently feeding a reducing gas through the powder at a pressure of 1.2–1.8 atm, maintaining the powder at said temperature in degrees centigrade equal to 0.3–0.5 of the melting temperature of the electrode material for a holding time long enough for the oxides contained in the powder to completely reduce, while continuing to feed the reducing gas, wherein the amount of the reducing gas is at least twice the stoichiometric quantity, said powder holding time followed by heating the powder to a temperature equal to 0.6–0.9 of the melting temperature in degrees centigrade of the elecrode material and applying a pressure necessary for shaping the material to a preset porosity.

4. A method as claimed in claim 3, wherein an excess amount of the reducing gas is about 2 times to about 40 times its stoichiometric quantity.

5. The porous material of claim 1, wherein said oxygen content varies from about 0.02 to about 0.04 wt.%.

6. The porous material of claim 1, wherein said oxygen content varies from about 0.07 to about 0.09 wt.%.

* * * * *